(12) United States Patent
Suto et al.

(10) Patent No.: US 12,188,389 B2
(45) Date of Patent: Jan. 7, 2025

(54) METHOD FOR FILLING SILENCER WITH SOUND ABSORBING MATERIAL

(71) Applicant: YUTAKA GIKEN CO., LTD., Hamamatsu (JP)

(72) Inventors: Yusuke Suto, Hamamatsu (JP); Katsunori Okoshi, Hamamatsu (JP); Akihito Saito, Hamamatsu (JP); Takeshi Maruyama, Hamamatsu (JP); Kazuyuki Shirai, Hamamatsu (JP)

(73) Assignee: Yutaka Glken Co., Ltd., Shyizuoka (JP)

( * ) Notice: Subject to any disclaimer, the term of this patent is extended or adjusted under 35 U.S.C. 154(b) by 120 days.

(21) Appl. No.: 18/018,155

(22) PCT Filed: Jul. 9, 2021

(86) PCT No.: PCT/JP2021/026010
§ 371 (c)(1),
(2) Date: Jan. 26, 2023

(87) PCT Pub. No.: WO2022/030184
PCT Pub. Date: Feb. 10, 2022

(65) Prior Publication Data
US 2023/0287815 A1 Sep. 14, 2023

(30) Foreign Application Priority Data
Aug. 7, 2020 (JP) .................................. 2020-135333

(51) Int. Cl.
*F01N 13/18* (2010.01)
*F01N 1/24* (2006.01)
(52) U.S. Cl.
CPC .............. *F01N 1/24* (2013.01); *F01N 13/18* (2013.01); *F01N 2450/06* (2013.01)

(58) Field of Classification Search
CPC ... F01N 1/04; F01N 1/10; F01N 1/125; F01N 1/24; F01N 2450/06
See application file for complete search history.

(56) References Cited

U.S. PATENT DOCUMENTS 5,633,482 A * 5/1997 Erion .................... F01N 13/082
181/282
6,158,547 A * 12/2000 Ackermann ........ F01N 13/1888
181/256
(Continued)

FOREIGN PATENT DOCUMENTS

JP  2004-518063 A  6/2004
JP  6495567 B1  4/2019
(Continued)

OTHER PUBLICATIONS

The International Search Report, PCT/ISA/210, from International Application PCT/2021/026010 including the English translation thereof.

*Primary Examiner* — Jonathan R Matthias
(74) *Attorney, Agent, or Firm* — Carrier, Shende & Associates P.C.; Joseph P. Carrier; Fulchand P. Shende (57) ABSTRACT

A method for filling a silencer with a sound absorbing material in which an inside of a shell is partitioned into a plurality of silencing chambers by a separator and at least one silencing chamber is filled with the material, the method including: forming a hole at the silencing chamber to be filled with the material in the shell; inserting a filling nozzle into the silencing chamber from the hole; injecting the material from the filling nozzle into the silencing chamber S2 for filling; and externally sealing the hole opening to the shell with a hole sealing member. An outer peripheral flange portion is abutted on and welded to an outer surface of the shell to seal the hole with the hole sealing member 8 allowing stably holding the silencer and easily filling the (Continued)

silencer with the material irrespective of a shell shape and a structure inside the shell.

8 Claims, 9 Drawing Sheets

(56) References Cited

U.S. PATENT DOCUMENTS

| | | | |
|---|---|---|---|
| 6,412,596 B1 | 7/2002 | Brandt et al. | |
| 11,286,820 B2 | 3/2022 | Omori | |
| 2005/0001012 A1* | 1/2005 | Brandt | F01N 1/04 |
| | | | 228/101 |
| 2019/0345856 A1* | 11/2019 | Brandt | F01N 1/006 |
| 2022/0065144 A1* | 3/2022 | Sugimoto | G10K 11/162 |

FOREIGN PATENT DOCUMENTS

| | | | |
|---|---|---|---|
| JP | 3226585 U | | 6/2020 |
| KR | 20200031381 A | * | 3/2020 |

* cited by examiner

METHOD FOR FILLING SILENCER WITH SOUND ABSORBING MATERIAL

TECHNICAL FIELD

The present invention relates to a method for filling a silencer with a sound absorbing material for the purpose of reducing an exhaust sound.

BACKGROUND ART

An internal combustion engine, which converts heat energy generated by burning an air-fuel mixture into motion energy, discharges exhaust gas in the atmosphere through a catalytic converter and a noise eliminator (silencer). Here, the silencer achieves functions of reducing sound (exhaust sound) generated when the exhaust gas is discharged from the internal combustion engine, and adjusting engine characteristics.

The silencer has a configuration in which an inside of a shell having a hollow container shape is partitioned into a plurality of silencing chambers by a separator (partition wall), and various kinds of pipes (for example, an inlet pipe and an outlet pipe) opening to the respective silencing chambers communicate between the plurality of silencing chambers. In the thus configured silencer, since the exhaust gas discharged from the internal combustion engine repeatedly expands and contracts in a process of the exhaust gas sequentially flowing to the respective silencing chambers through the various kinds of pipes, noise energy of the exhaust gas is attenuated, and thus the exhaust sound is reduced.

In some silencers, the silencing chambers are filled with sound absorbing materials (roving materials), such as glass fiber. The silencer causes the exhaust gas to pass through or contact the sound absorbing material to absorb sound, thus allowing a further enhanced silencing effect. The manufacturing process of the silencer requires a step of filling the silencing chamber inside a shell with the sound absorbing material, and Patent Documents 1 and 2, for example, propose methods and apparatuses for uniformly filling the sound absorbing material.

That is, Patent Document 1 proposes the method and the apparatus for filling an internal space with a sound absorbing material (glass fiber), the internal space being situated between a case and an inner pipe of a silencer in which the inner pipe penetrates through a pair of through-holes of a cylindrical-shaped shell (the case). Specifically, there have been proposed the method and apparatus that shift the inner pipe in the penetrating direction from a regular fixed position, insert a filling nozzle into the inside of the shell from the through-hole of the shell that is opened by shifting the inner pipe, and inject the sound absorbing material into the internal space from the filling nozzle while rotating the silencer, for filling the internal space with the sound absorbing material.

Additionally, Patent Document 2 proposes the method that includes forming a fill opening in a part of an end portion opening to an end wall of a shell of a pipe (perforated pipe), inserting a filling nozzle from the fill opening, and injecting a sound absorbing material from the filling nozzle into a silencing chamber (internal compartment), so as to fill the silencing chamber with the sound absorbing material.

Patent Document 1: Japanese Patent No. 6495567
Patent Document 2: JP-T-2004-518063

DISCLOSURE OF THE INVENTION

Problems to be Solved by the Invention

However, the filling method and the filling apparatus proposed in Patent Document 1 targets the silencer including the shell having the cylindrical shape (axisymmetrical shape), and therefore a small-sized simple structure can be used as a supporting portion that supports the silencer, and the sound absorbing material can be filled while the silencer is rotated around its axis. However, a silencer whose shell shape is not a simple cylindrical shape (axisymmetrical shape) has a large-sized complicated supporting structure, and a sound absorbing material cannot be filled while the silencer is rotated. Additionally, only a linear inner pipe is allowed to be shifted in a penetrating direction, and an inner pipe partially having a bent portion is problematic in that the inner pipe cannot be easily shifted in a penetrating direction.

The filling method proposed in Patent Document 2 has a problem that the sound absorbing material is limitedly filled in only the silencing chamber located at the end portions among the plurality of silencing chambers in the shell partitioned by the separators. Further, the diameter of the fill opening that opens to the end portion of the pipe (perforated pipe) is restricted by the diameter of the pipe, and thus a fill opening having a large diameter cannot be formed. Furthermore, since the direction of the fill opening is determined by the insertion direction of the filling nozzle, it also raises a problem that the filling work is not easy.

The present invention has been made in consideration of the above-described problems, and an object thereof is to provide a method for filling a silencer with a sound absorbing material that allows stably holding the silencer and easily filling the silencer with the sound absorbing material with excellent work efficiency irrespective of a shell shape and a structure inside the shell.

Solutions to the Problems

In order to achieve the above-described object, according to a first feature of the present invention, there is proposed a method for filling a silencer with a sound absorbing material in which an inside of a shell is partitioned into a plurality of silencing chambers by a separator and at least one silencing chamber is to be filled with the sound absorbing material. The method includes: forming a hole at a portion corresponding to the silencing chamber to be filled with the sound absorbing material in the shell; injecting the sound absorbing material from the hole into the silencing chamber for filling the silencing chamber with the sound absorbing material; and sealing the hole from an outside of the shell with a hole sealing member after the filling.

According to a second feature of the present invention in addition to the first feature, there is proposed the method for filling the silencer with the sound absorbing material in which the silencing chamber to be filled with the sound absorbing material is suctioned, and the silencing chamber is filled with the sound absorbing material by injecting the sound absorbing material into the silencing chamber from a filling nozzle inserted from the outside of the shell into the hole.

According to a third feature of the present invention in addition to the first or second feature, there is proposed the method for filling the silencer with the sound absorbing material includes welding an outer peripheral flange portion of the hole sealing member abutting on an outer surface of the shell to the outer surface of the shell to seal the hole with the hole sealing member.

According to a fourth feature of the present invention in addition to the third feature, there is proposed the method for filling the silencer with the sound absorbing material in which a part of the outer surface of the shell is configured by a flat surface, the outer peripheral flange portion of the hole sealing member abutting on the part.

According to a fifth feature of the present invention in addition to any one of the first to fourth features, there is proposed the method for filling the silencer with the sound absorbing material in which the hole sealing member is formed in a cup shape with a bottom.

According to a sixth feature of the present invention in addition to any one of the first to fifth features, there is proposed the method for filling the silencer with the sound absorbing material in which the hole sealing member doubles as a mounting bracket.

Effects of the Invention

According to the first feature of the present invention, the hole having a necessary and sufficient size can be easily formed in the shell, and the filling nozzle is inserted into the hole and the silencing chamber inside the shell can be filled with the sound absorbing material. In this case, since a degree of freedom of, for example, a direction and/or a turn of the filling nozzle is high, the sound absorbing material can be filled easily with excellent work efficiency. This filling work is allowed to be performed without rotating the silencer, and the silencer is stably held irrespective of a shell shape and a structure inside the shell, and therefore a structure of a holding mechanism to hold the silencer is allowed to be simplified and downsized.

According to the second feature of the present invention, the silencing chamber to be filled with the sound absorbing material is suctioned, and the sound absorbing material is filled, and therefore the silencing chamber can be efficiently and reliably filled with the sound absorbing material.

According to the third feature of the present invention, since the outer peripheral flange portion of the hole sealing member is welded to the outer surface of the shell to fixedly secure the hole sealing member to the outer surface of the shell and seal the hole, thereby enhancing rigidity of the hole sealing member. Consequently, the hole sealing member can be thinned and its weight can be reduced.

According to the fourth feature of the present invention, the outer peripheral flange portion of the hole sealing member is welded with the outer peripheral flange portion being in close contact with the flat outer surface of the shell. Accordingly, the hole sealing member can be reliably mounted to the outer surface of the shell and the hole can be sealed with the hole sealing member. Additionally, since the hole opens in the flat outer surface of the shell, a filling work of the sound absorbing material via the hole and a positioning work of the hole sealing member for sealing the hole after the filling are facilitated.

According to the fifth feature of the present invention, since the hole sealing member is formed to have the cup shape with the bottom, when the hole sealing member is fixedly secured to the outer surface of the shell, the inside of the hole sealing member communicates with the silencing chambers. This allows increasing a capacity of the silencer by a volume of the internal space of the hole sealing member to enhance the silencing effect, and enhancing rigidity of the shell by the hole sealing member. Mating end portions of the hole sealing member and the shell facilitates positioning of the hole sealing member with respect to the shell.

According to the sixth feature of the present invention, the hole sealing member doubles as the function of the mounting bracket for mounting the silencer. This allows reducing the number of components, thereby achieving weight reduction of the silencer and cost saving.

BRIEF DESCRIPTION OF THE DRAWINGS

FIG. 8(*a*) is a perspective view of the hole sealing member from obliquely upward, and FIG. 8(*b*) is a perspective view of the hole sealing member from obliquely downward.

DESCRIPTION OF REFERENCE SIGNS 1 silencer
2 shell
3 separator
3a small hole of separator
4 inlet pipe
5 outlet pipe
6 sound absorbing material
7 hole
8 hole sealing member
8a outer peripheral flange portion of hole sealing member
9 hook member
10 mounting bracket
11 filling nozzle
12 hose
13 suction pump
S1 first silencing chamber
S2 second silencing chamber

DESCRIPTION OF PREFERRED EMBODIMENTS

The following will describe embodiments of the present invention with reference to the attached drawings.

Figure 1:
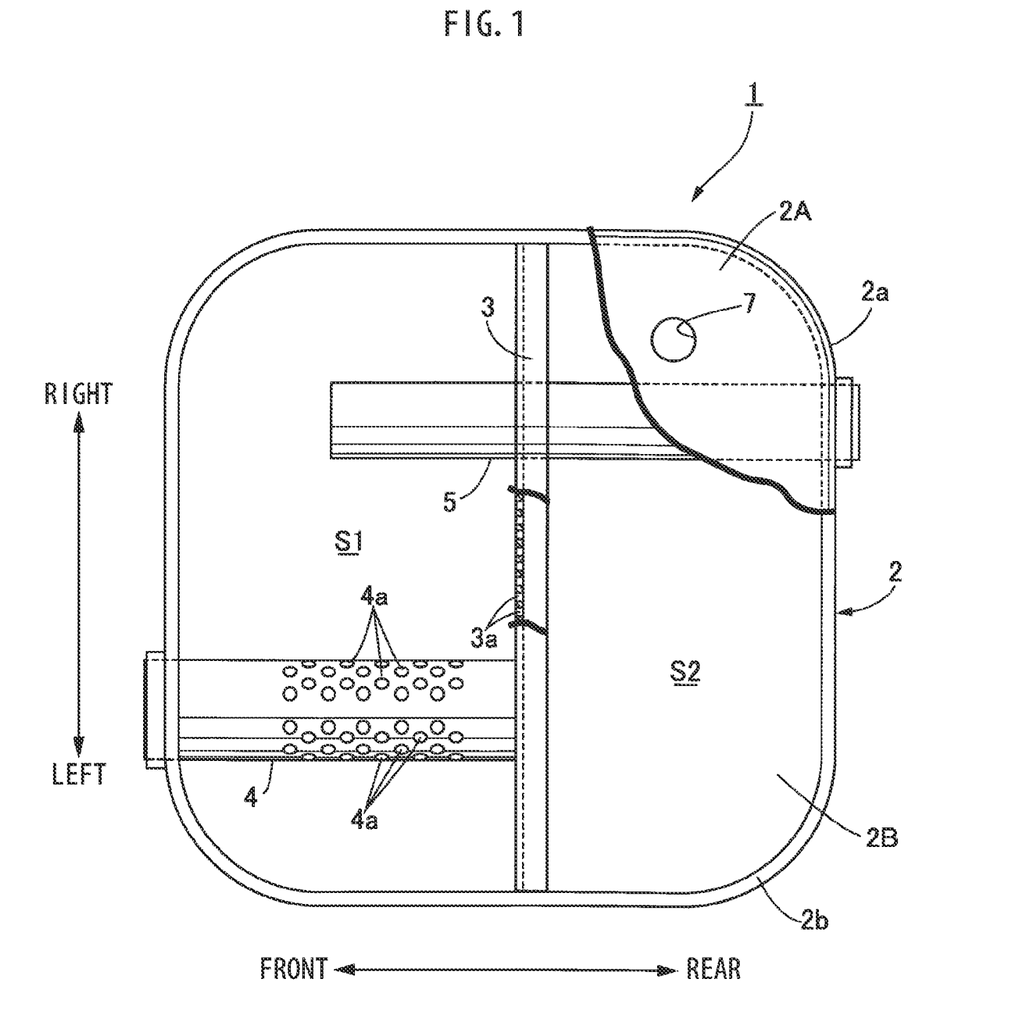
FIG. 1 is a cutaway plan view of a silencer before a sound absorbing material is filled.
Figure 2:
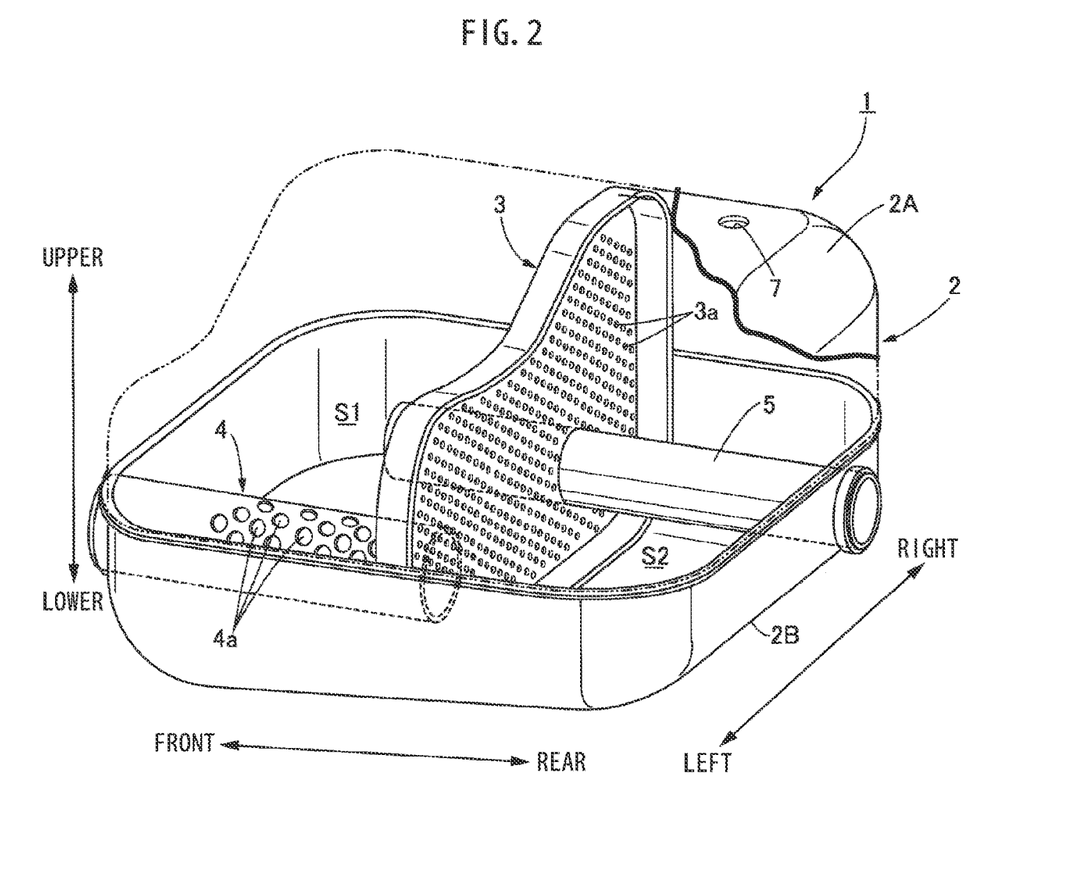
FIG. 2 is a cutaway perspective view of the silencer before the sound absorbing material is filled.
Figure 3:
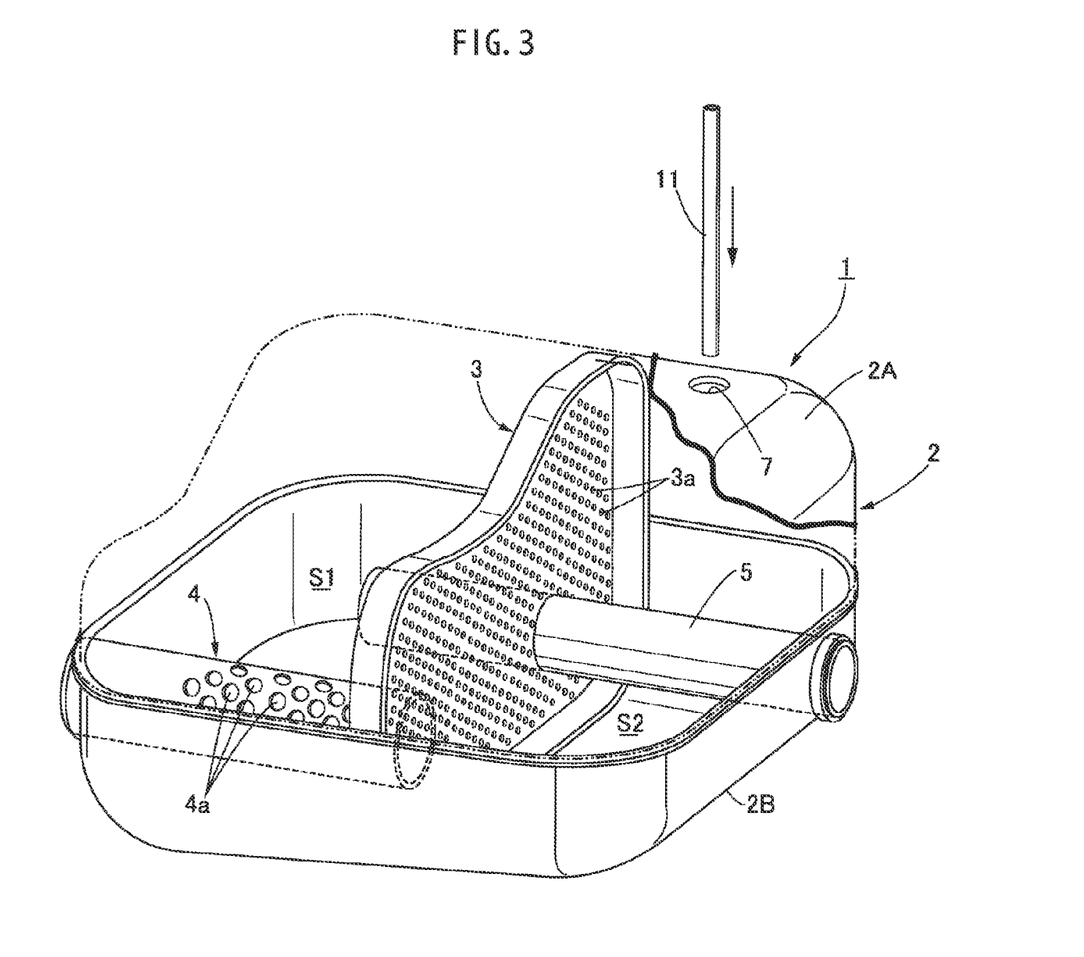
FIG. 3 is a cutaway perspective view illustrating a state before a filling nozzle is inserted into a hole formed in a shell of the silencer before the sound absorbing material is filled.
Figure 4:
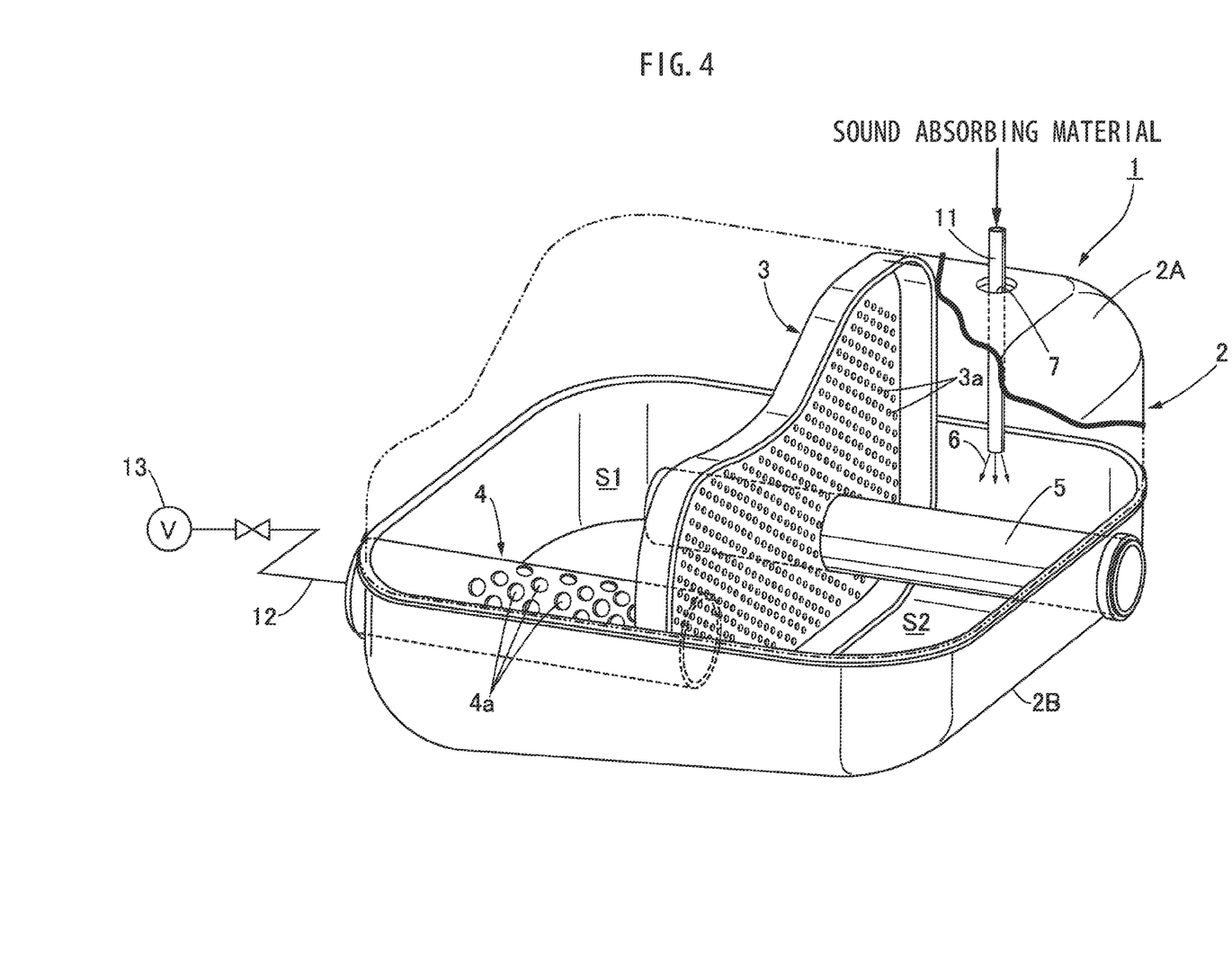
FIG. 4 is a cutaway perspective view illustrating a state in which the filling nozzle is inserted into the hole formed in the shell of the silencer and the sound absorbing material is filled.
Figure 5:
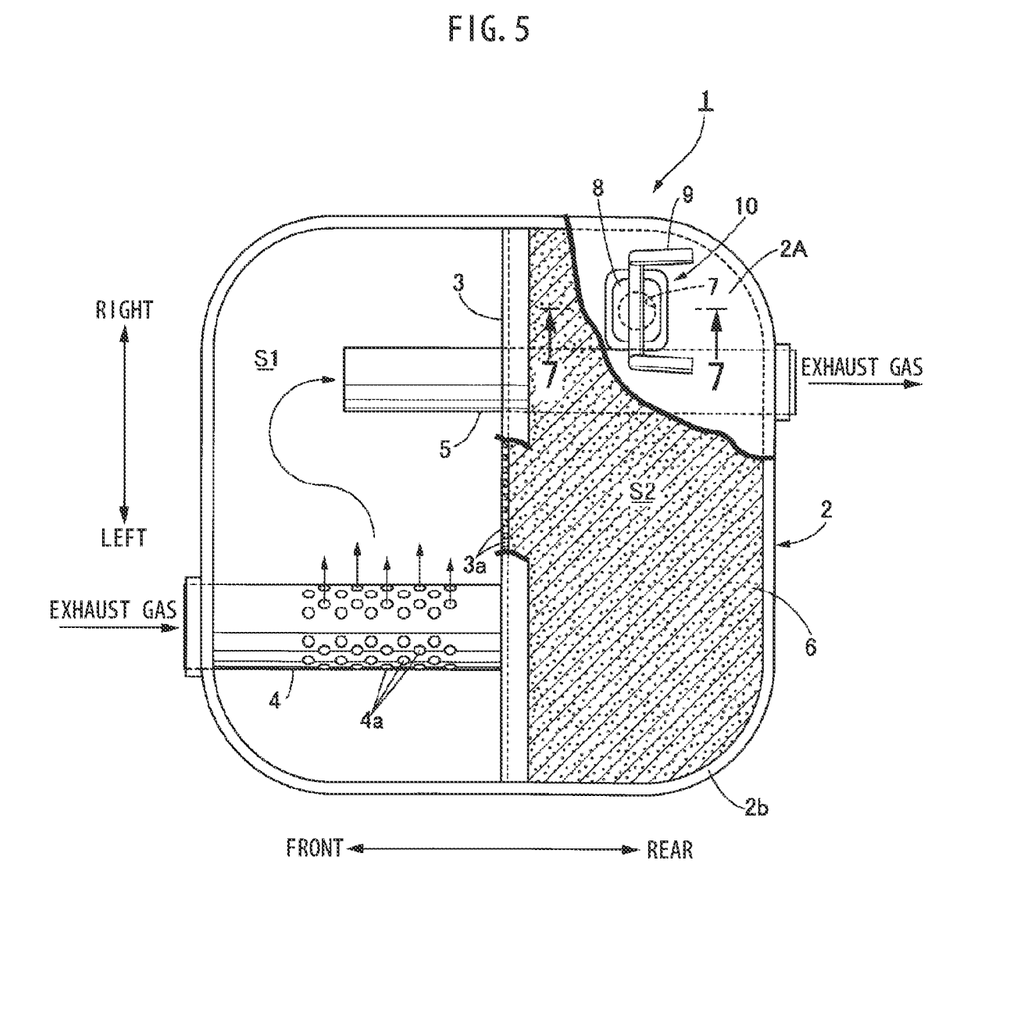
FIG. 5 is a cutaway plan view of the silencer illustrating a state in which the hole of the shell is sealed with a hole sealing member (mounting bracket) after the sound absorbing material is filled.
Figure 6:
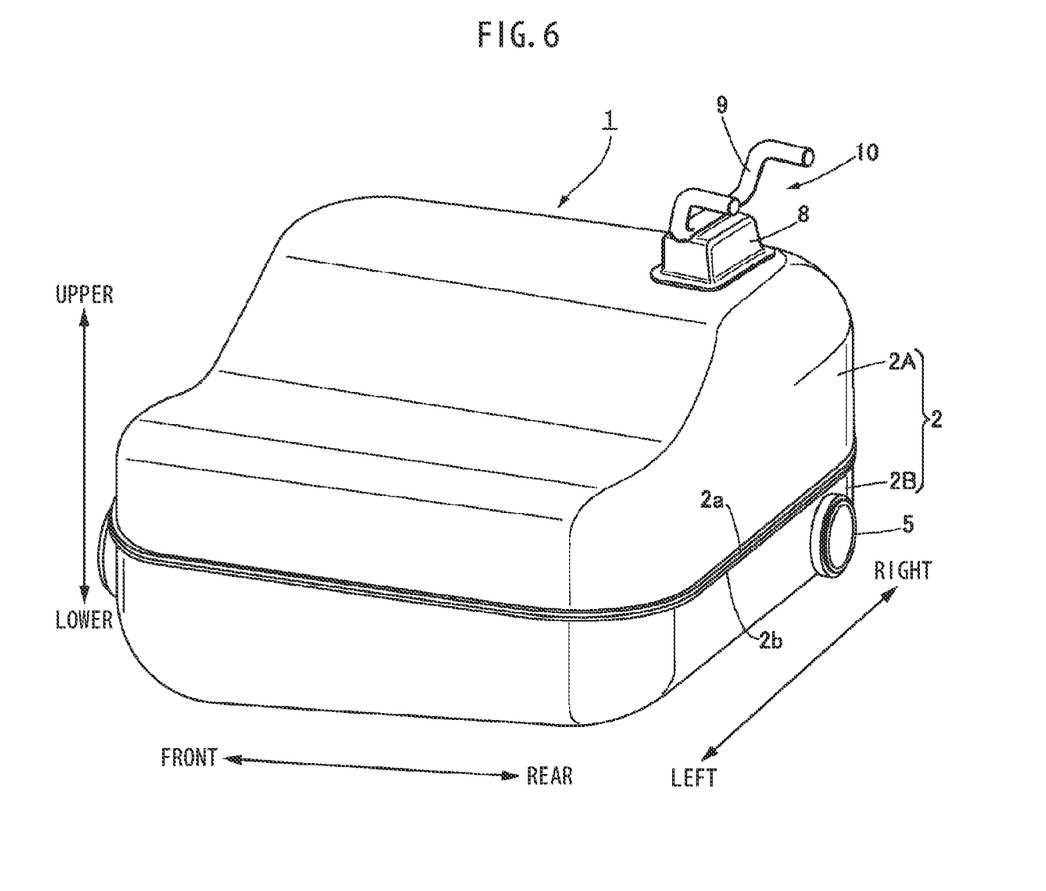
FIG. 6 is a perspective view of the silencer illustrating a state in which the hole of the shell is sealed with the hole sealing member (mounting bracket) after the sound absorbing material is filled.
Figure 7:
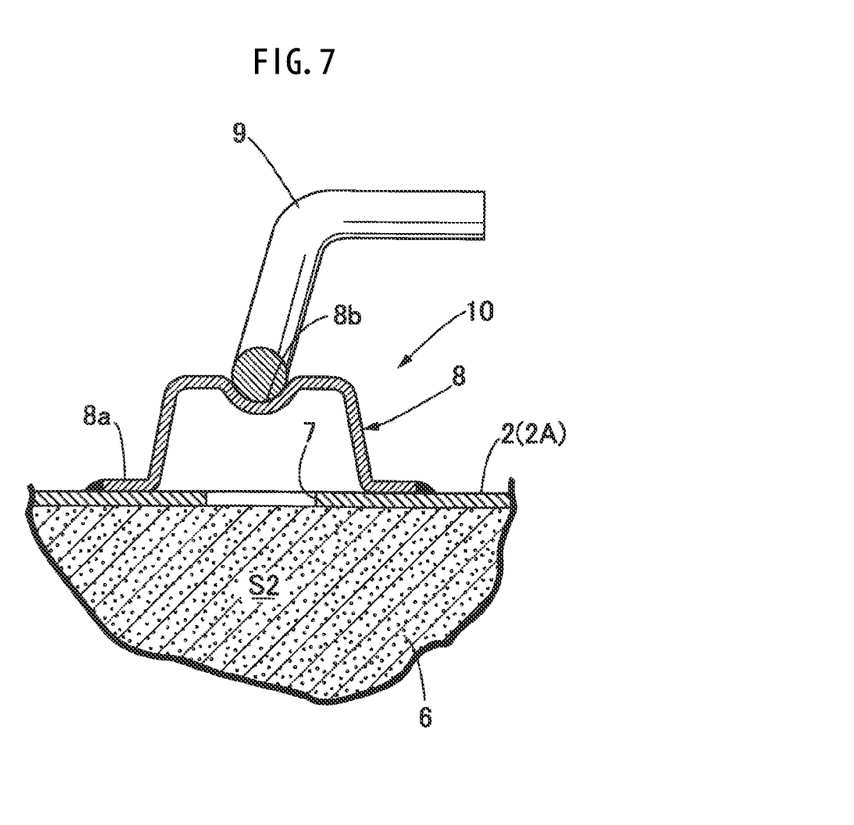
FIG. 7 is an enlarged cross-sectional view of the line 7-7 in FIG. 5.

FIG. 1 is a cutaway plan view of a silencer before a sound absorbing material is filled. FIG. 2 is a cutaway perspective view of the silencer before the sound absorbing material is filled. FIG. 3 is a cutaway perspective view illustrating a state before a filling nozzle is inserted into a hole formed in a shell of the silencer before the sound absorbing material is filled. FIG. 4 is a cutaway perspective view illustrating a state in which the filling nozzle is inserted into the hole formed in the shell of the silencer and the sound absorbing material is filled. FIG. 5 is a cutaway plan view of the silencer illustrating a state in which the hole of the shell is sealed by a hole sealing member (mounting bracket) after the sound absorbing material is filled. FIG. 6 is a perspective view of the silencer illustrating a state in which the hole of the shell is sealed with the hole sealing member (mounting bracket) after the sound absorbing material is filled. FIG. 7 is an enlarged cross-sectional view of the line 7-7 in FIG. 5. FIG. 8(a) is a perspective view of the hole sealing member from obliquely upward, and FIG. 8(b) is a perspective view of the hole sealing member from obliquely downward. FIG. 9 is a perspective view of the mounting bracket.

A silencer 1 according to this embodiment reduces sound of exhaust gas (exhaust sound) discharged from an internal combustion engine (not illustrated), which is a driving source of a vehicle, and includes a shell 2 having a hollow container shape. As illustrated in FIG. 1 and FIG. 2, an inside of the shell 2 is partitioned into a first silencing chamber S1 and a second silencing chamber S2 by a separator 3 that stands perpendicularly.

As illustrated in FIG. 6, the shell 2 is configured as a monaka (a Japanese sweet)-shaped hollow container by welding respective opening peripheral edges 2a, 2b of shell half bodies 2A, 2B having cup shapes with bottoms split into two, an upper and a lower. Note that each of the shell half bodies 2A, 2B can be obtained by press-forming a metal plate, such as a SUS material. Here, in the silencer 1, respective directions indicated by the arrows in FIG. 1 and FIG. 2 are defined as "front and rear," "right and left," and "up and down" directions.

Additionally, as illustrated in FIG. 1 and FIG. 2, an inlet pipe 4 penetrates in the front-rear direction on the left end side (the lower side of FIG. 1) of the front end wall of the shell half body 2B of the shell 2 and faces the first silencing chamber S1. An exhaust pipe (not illustrated) extending from an exhaust system of the internal combustion engine (not illustrated) is coupled to one end (front end) of the inlet pipe 4 opening to the front end wall of the shell half body 2B. The other end (rear end) of the inlet pipe 4 abuts on the separator 3, and its peripheral area is fixedly secured (welded). Here, the inlet pipe 4 is configured as a perforated pipe in which multiple circular small holes 4a are formed. Additionally, the separator 3 is configured as a perforated plate (perforated metal) in which multiple circular small holes 3a are formed.

Additionally, at the right end side of the separator 3, an outlet pipe 5 penetrates in the front-rear direction to be in parallel with the inlet pipe 4. The outlet pipe 5 has one end (front end) opening to the first silencing chamber S1 and the other end (rear end) opening to the rear end wall of the shell half body 2B on the lower side. Note that, in this embodiment, the separator 3, the inlet pipe 4, and the outlet pipe 5 are made of a metal having high heat resistance and corrosion resistance, such as a SUS material, similarly to the shell 2.

In the silencer 1 according to this embodiment, as illustrated in FIG. 5, the second silencing chamber S2 is filled with a sound absorbing material (roving material) 6, such as glass fiber, and the following will describe a method for filling the second silencing chamber S2 with the sound absorbing material 6.

As illustrated in FIG. 1 to FIG. 4, a circular hole 7 is formed in the upper surface on the right end side of the portion corresponding to the second silencing chamber S2 of the shell 2 (shell half body 2A). To fill the silencing chamber S2 with the sound absorbing material 6, the silencer 1 is placed on a support table of a holding mechanism (not illustrated) such that the shell half body 2B on the lower side is located below.

Next, a filling nozzle 11 extending from a filling apparatus (not illustrated) is inserted into the hole 7 as illustrated in FIG. 4 from upward of the hole 7, which opens in the upper surface of the shell 2 (shell half body 2A) of the silencer 1 as illustrated in FIG. 3. Then, as illustrated in FIG. 4, the distal end of the filling nozzle 11 opens to the second silencing chamber S2 of the silencer 1. Driving a charging apparatus (not illustrated) injects the sound absorbing material 6, such as glass fiber, from the distal end opening of the filling nozzle 11 to the second silencing chamber S2, and the second silencing chamber S2 is filled with the sound absorbing material 6. At this time, as illustrated in FIG. 4, when a suction pump 13 is coupled to the inner pipe 4 via a hose 12 and the suction pump 13 is driven to suction the first and second silencing chambers S1, S2 inside the silencer 1, and the sound absorbing material 6 is injected to the second silencing chamber S2 with the filling nozzle 11, the second silencing chamber S2 is efficiently and reliably filled with the sound absorbing material 6 (see FIG. 5). Here, the suction pump 13 may be coupled to the outlet pipe 5, and driving the suction pump 13 in the state also allows suctioning the first and second silencing chambers S1, S2.

Thus, when the second silencing chamber S2 of the silencer 1 is filled with the sound absorbing material 6, as illustrated in FIG. 5 and FIG. 6, the hole 7 opening in the upper surface of the shell 2 (shell half body 2A) is sealed by a hole sealing member 8 as a cap.

Figure 8:
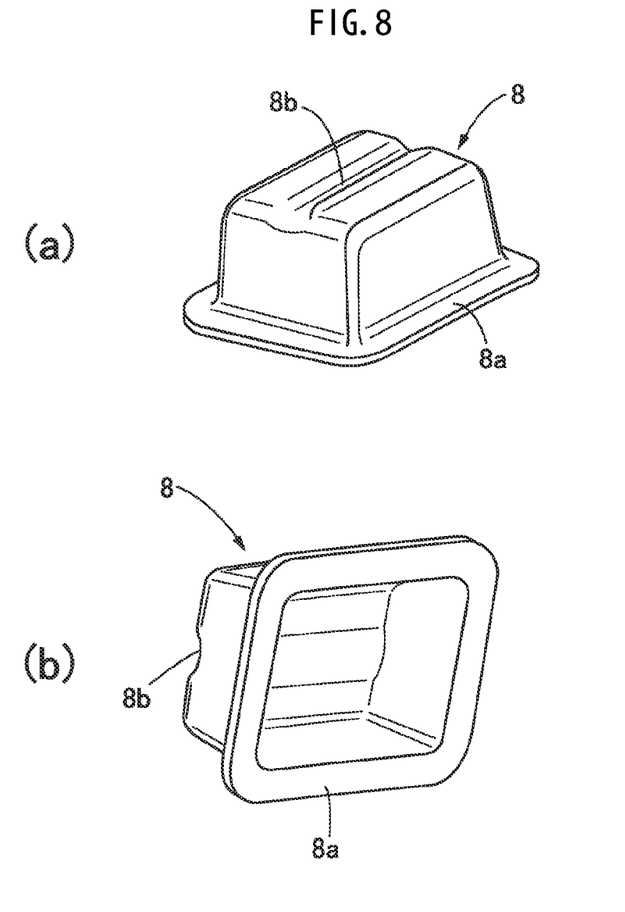
Figure 9:
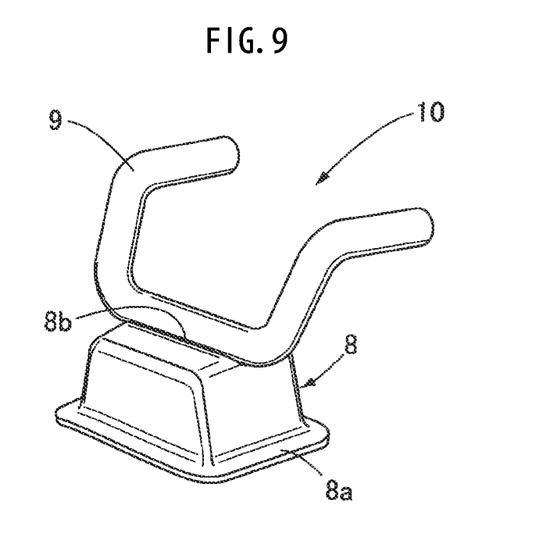
FIG. 9 is a perspective view of the mounting bracket.

As illustrated in FIG. 8, the hole sealing member 8 is a rectangular cup-shaped lid member with a bottom obtained by press-forming a metal plate, and a rectangular ring-shaped outer peripheral flange portion 8a is formed on the peripheral edge of the opening.

A part where the hole 7 is formed in the shell 2 (shell half body 2A) of the silencer 1 forms a flat surface, and the hole sealing member 8 is overlayed on the upper surface of the shell 1 so as to close the hole 7 opening in the upper surface of the shell 2 (shell half body 2A) from upward. At this time, since the peripheral area of the part of the shell 2 where the hole 7 opens has the flat surface as described above, as illustrated in FIG. 7, when the hole sealing member 8 is overlayed on the upper surface of the shell 2 so as to cover the hole 7 from upward, the outer peripheral flange portion 8a of the hole sealing member 8 closely contacts the upper surface of the shell 2. When the peripheral area of the outer peripheral flange portion 8a of the hole sealing member 8 is welded in the state, the hole sealing member 8 is fixedly secured in the state of closely contacting the upper surface of the shell 2, and the hole 7 opening in the upper surface of the shell 2 is sealed with the hole sealing member 8.

Here, as illustrated in FIG. 8, a depressed groove 8b having a semicircular lateral cross-sectional surface is formed along the longitudinal direction at the center in the width direction of the upper surface of the hole sealing member 8, and a hook member 9 is engaged with and welded to the depressed groove 8b. For example, the hole sealing member 8 and the hook member 9 constitute a mounting bracket 10 for mounting the silencer 1 to another component. Note that the hook member 9 is configured by bending and forming a metal bar.

Thus, as illustrated in FIG. 5, the second silencing chamber S2 is filled with the sound absorbing material 6. In the silencer 1 in which the hole 7 opening in the upper surface of the shell 2 is sealed with the hole sealing member 8 constituting the mounting bracket 10 after the sound absorbing material 6 is filled, the exhaust gas discharged from the internal combustion engine (not illustrated) is introduced to the first silencing chamber S1 from the inlet pipe 4. That is, the exhaust gas flowing through the inlet pipe 4 flows out from multiple small holes 4a formed in the inlet pipe 4 to the first silencing chamber S1. The exhaust gas flowed into the first silencing chamber S1 contacts the sound absorbing material 6 via the small holes 3a of the separator 3 while the sound is absorbed, flows into the outlet pipe 5, and is finally discharged in the atmosphere.

As described above, the exhaust gas discharged from the internal combustion engine repeatedly expands and contracts in the process of passing through the silencer 1 to attenuate noise energy and the sound of the exhaust gas is absorbed by the sound absorbing material 6, and thus the exhaust sound is reduced to achieve silentness.

As described above, in this embodiment, the hole 7 having necessary and sufficient size can be easily formed in the shell 2 (shell half body 2A) of the silencer 1. The filling nozzle 11 is inserted into the hole 7 and the second silencing chamber S2 inside the shell 2 can be filled with the sound absorbing material 6. In this case, since a degree of freedom of, for example, the direction and/or turn of the filling nozzle 11 is high, the sound absorbing material 6 can be easily filled with excellent work efficiency. This filling work is allowed to be performed without rotating the silencer 1, and the silencer 1 is stably held irrespective of the shell shape 2 and the structure inside the shell 2, and therefore a structure of a holding mechanism to hold the silencer 1 is allowed to be simplified and downsized.

Additionally, when filling of the second silencing chamber S2 of the silencer 1 with the sound absorbing material 6 ends, the outer peripheral flange portion 8a of the hole sealing member 8 is welded to the upper surface of the shell 2 to fixedly secure the hole sealing member 8 to the upper surface of the shell 2 and seal the hole 7, thus enhancing the rigidity of the hole sealing member 8. Consequently, the hole sealing member 8 can be thinned and the weight can be reduced.

Furthermore, in this embodiment, the welding is performed with the outer peripheral flange portion 8a of the hole sealing member 8 closely contacting the flat surface of the outer surface of the shell 2. This allows reliably mounting the hole sealing member 8 to the upper surface of the shell 2 and sealing the hole 7 with the hole sealing member 8. In this case, since the hole 7 opens in the flat surface of the upper surface of the shell 2, the filling work of the sound absorbing material 6 via the hole 7 and the positioning work of the hole sealing member 8 for sealing the hole 7 after the filling are facilitated.

Additionally, since the hole sealing member 8 is formed to have the cup shape with the bottom, when the hole sealing member 8 is fixedly secured to the upper surface of the shell 2, as illustrated in FIG. 7, the bottom projects outward of the shell so that the inside of the hole sealing member 8 communicates with the first and second silencing chambers S1, S2. This allows increasing the capacity of the silencer 1 by the volume of the internal space of the hole sealing member 8 to enhance the silencing effect, and enhancing the rigidity of the shell 2 by the hole sealing member 8. Mating the end portions of the hole sealing member 8 and the shell 2 facilitates the positioning of the hole sealing member 8 with respect to the shell 2.

In this embodiment, for example, the hole sealing member 8 and the hook member 9 are configured as the mounting bracket 10 for mounting the silencer 1. This allows reducing the number of components, thereby obtaining effects of weight reduction of the silencer 1 and cost saving.

Note that while the method for filling the second silencing chamber S2 of the silencer 1 with the sound absorbing material 6 in which the inside of the shell 2 is partitioned into the two, first and second silencing chambers S1, S2 by one separator 3 has been described above, the present invention is similarly applicable to a case where any silencing chamber is filled with a sound absorbing material in a silencer in which an inside of a shell is partitioned into a plurality of three or more silencing chambers by a plurality of two or more separators.

Moreover, the present invention is also similarly applicable to a method for filling a silencing chamber with a sound absorbing material in a silencer that includes a plurality of pipes including, for example, an inner pipe, in addition to an inlet pipe and an outlet pipe, inside a shell.

Furthermore, while the configuration of applying the present invention to the method for filling the silencer with the sound absorbing material for reducing the sound (exhaust sound) of the exhaust gas discharged from an engine of a vehicle has been described above, the present invention is also similarly applicable to a method for filling a silencer with a sound absorbing material for reducing sound (exhaust sound) of exhaust gas discharged from any device other than an engine.

Besides, the application of the present invention is not limited to the embodiments described above, and obviously, various modifications are possible within the scope of the technical idea described in the claims, the Description, and the drawings.

The invention claimed is:

1. A method for filling a silencer with a sound absorbing material, an inside of a shell being partitioned into a plurality of silencing chambers by a separator, at least one silencing chamber being to be filled with the sound absorbing material, the method comprising:
    forming a hole at a portion corresponding to the silencing chamber to be filled with the sound absorbing material in the shell;
    injecting the sound absorbing material from the hole into the silencing chamber for filling the silencing chamber with the sound absorbing material; and
    sealing the hole from an outside of the shell with a hole sealing member after the filling,
    wherein the hole sealing member is formed in a cup shape with a bottom that projects outside of the shell, and
    wherein the hole sealing member doubles as a mounting bracket.

2. The method for filling the silencer with the sound absorbing material according to claim 1, wherein
    the silencing chamber to be filled with the sound absorbing material is suctioned, and the silencing chamber is filled with the sound absorbing material by injecting the sound absorbing material into the silencing chamber from a filling nozzle inserted from the outside of the shell into the hole.

3. The method for filling the silencer with the sound absorbing material according to claim 1, wherein the sealing step involves welding an outer peripheral flange portion of the hole sealing member abutting on an outer surface of the shell to the outer surface of the shell to seal the hole with the hole sealing member.

4. The method for filling the silencer with the sound absorbing material according to claim 3, wherein
a part of the outer surface of the shell is configured by a flat surface, the outer peripheral flange portion of the hole sealing member abutting on the part.

5. A method for filling a silencer with a sound absorbing material, an inside of a shell being partitioned into a plurality of silencing chambers by a separator, at least one silencing chamber being to be filled with the sound absorbing material, the method comprising:
   forming a hole at a portion corresponding to the silencing chamber to be filled with the sound absorbing material in the shell;
   injecting the sound absorbing material from the hole into the silencing chamber for filling the silencing chamber with the sound absorbing material; and
   sealing the hole from an outside of the shell with a hole sealing member after the filling,
   wherein the hole sealing member is formed in a cup shape with a bottom that projects outside of the shell,
   wherein the hole sealing member doubles as a mounting bracket, and
   wherein the mounting bracket has a hook member fixed to the bottom of the hole sealing member.

6. The method for filling the silencer with the sound absorbing material according to claim 5, wherein
   the silencing chamber to be filled with the sound absorbing material is suctioned, and the silencing chamber is filled with the sound absorbing material by injecting the sound absorbing material into the silencing chamber from a filling nozzle inserted from the outside of the shell into the hole.

7. The method for filling the silencer with the sound absorbing material according to claim 5, wherein the sealing step involves welding an outer peripheral flange portion of the hole sealing member abutting on an outer surface of the shell to the outer surface of the shell to seal the hole with the hole sealing member.

8. The method for filling the silencer with the sound absorbing material according to claim 7, wherein
   a part of the outer surface of the shell is configured by a flat surface, the outer peripheral flange portion of the hole sealing member abutting on the part.

* * * * *